United States Patent [19]

Butter et al.

[11] Patent Number: 5,566,178
[45] Date of Patent: Oct. 15, 1996

[54] METHOD AND SYSTEM FOR IMPROVING THE PERFORMANCE OF A TOKEN RING NETWORK

[75] Inventors: Adrian S. Butter, Binghamton, N.Y.; Chang Y. Kao, Boulder, Colo.; James P. Kuruts, Forest City, Pa.

[73] Assignee: International Business Machines Corporation, Armonk, N.Y.

[21] Appl. No.: 363,425

[22] Filed: Dec. 22, 1994

[51] Int. Cl.$^6$ .................................................. H04L 12/433
[52] U.S. Cl. ................ 370/85.5; 370/85.15; 340/825.05
[58] Field of Search .......................... 370/16.1, 85.4, 370/85.5, 85.7, 85.8, 85.15, 95.1, 95.2; 340/825.05, 825.08, 825.54; 371/20.6, 32, 33

[56] References Cited

U.S. PATENT DOCUMENTS

| | | | |
|---|---|---|---|
| 4,792,947 | 12/1988 | Takiyasu et al. | 370/85.5 |
| 4,817,082 | 3/1989 | Orsic | 370/85.5 |
| 4,941,142 | 7/1990 | Kida | 370/85.5 |
| 5,012,468 | 4/1991 | Siegel et al. | 370/85.5 |
| 5,023,871 | 6/1991 | Nakayashiki et al. | 370/85.5 |
| 5,140,586 | 8/1992 | Kloper et al. | 370/85.5 |
| 5,155,726 | 10/1992 | Spinney et al. | 370/85.5 |
| 5,241,540 | 8/1993 | Ocheltree | 370/85.12 |
| 5,379,291 | 1/1995 | Herzberg et al. | 370/85.5 |

*Primary Examiner*—Alpus H. Hsu
*Attorney, Agent, or Firm*—Baker, Maxham, Jester & Meador

[57] ABSTRACT

A system and method for implementing a new protocol that uses new data structures in order to improve the performance of a token ring without changing its topology or degrading its fairness. A primary sender sends a data frame containing a data field addressed to a primary receiver. The protocol allows the primary receiver to enter "transmit mode" and assume another role as a secondary sender when the data frame is received and copied. The secondary sender overwrites the data field. Then, the secondary sender designates a secondary receiver to receive the update data and sends an acknowledgement message back to the primary sender to indicate that it has received data. The secondary receiver sends an acknowledgement to the secondary sender when the secondary transmission data is received. The primary sender checks for an acknowledgement from the primary receiver when the data frame returns. Then the primary sender transmits the data frame downstream. The primary sender regenerates a token and either releases it or seizes it based on whether it has more data to send. The secondary sender verifies the acknowledgement from the secondary receiver and returns to "listen mode".

55 Claims, 8 Drawing Sheets

FIG. 1

Conventional Token Frame Format

*FIG. 2 (Prior Art)*

Conventional Data Frame Format

METHOD AND SYSTEM FOR IMPROVING THE PERFORMANCE OF A TOKEN RING NETWORK

BACKGROUND OF THE INVENTION

1. Field of the Invention

The present invention relates to a method and system for efficiently managing data traffic on a local area network, and more particularly to the implementation of a new protocol and new data structures to improve the performance of a token ring network without requiring any changes to its topology.

2. Description of the Related Art

A local area network (LAN) is a collection of interconnected data processing resources, such as computers and printers, that may communicate and share each other's resources. The designation of "local" is a relative term, but a typical implementation of a LAN spans a single building or a group of neighboring buildings. Design choices for implementing a local area network include physical considerations such as type of media (e.g. coaxial cable, twisted pair, or fiber optics) and physical topology (e.g. bus, tree, star, or ring). Additionally, there are logical considerations which include access control and logical topology. The logical topology refers to how information is passed on the network. Access control is a broad term that generally refers to the control of data traffic on the network and typically is achieved by the use of one or more protocols.

The implemented protocol determines which stations have priority to access the media to send data and often depends on the physical and logical topology. On a bus topology, such as the one implemented by the Ethernet product (IEEE 802.3 protocol), access to the media is on an "as available basis" and software techniques are employed to manage media access. Such techniques include "data carrier detection" to determines if the media is busy, and "collision avoidance" to prevent garbled messages from two or more stations transmitting simultaneously.

Collisions are avoided in a ring topology implemented by the token ring product (IEEE 802.5 protocol), because a single "token" is used to gain access to the media. The token is a control signal, that circulates from one station to another until it is "seized" by a station that wishes to send data. Since a station can not send data without gaining control of the token, collisions are inherently avoided. The station seizing the token is known as the "sender" and a station designated as the destination, is known as the "receiver." The sender station is said to have entered "transmit mode"—a mode only available to the token holder with the prior art protocols. All of the other stations on the ring, including the receiver station are in "listen mode".

The information circulates from one station to the next around the ring. Each bit arriving at a station's interface is copied into a 1-bit buffer and then copied back onto the ring, introducing a 1-bit delay time for each interface. While the information is in the buffer, each bit can be inspected. During this inspection, the receiver can recognize its address and copies all of the data designated as a "data frame" from the interface to the station's data bus. The sender will typically require several transmissions to send all of its intended message, depending on factors such as bandwidth (e.g., IBM provides a coaxial cable based token ring product that transmits at 4 Megabits per second and also at 16 Megabits per second). Typically, the first bit of a "full frame" will circulate all the way around the ring and return to the sender before the entire frame has been transmitted. The full frame comprises the information field and also other fields, including source and destination address. The sender is responsible for stripping each bit of data from the ring as it returns.

A station may hold the token for a predetermined "token holding" time. Typically this time is 10 msec, and is set at installation. If there is enough time left after the first frame has been transmitted then the sender may send more frames. If more time is needed to send additional frames, then the sender regenerates a 3 byte token frame, which it also seizes. If the last frame has been sent or the token holding time has expired, a new token is regenerated but released onto the ring.

One particularly fast token ring network, which uses optical fiber, is known as the fiber distributed data interface (FDDI) and has a bandwidth of 100 Megabits per second. The basic FDDI protocol is closely modeled on the 802.5 protocol, but accounts for the increased capability of optical fiber. Optical FDDI networks are capable of supporting up to 1000 stations spanning a distance of 200 kilometers. If the 802.5 protocol were not deviated from, there would be a considerable time penalty introduced because new data frames could not be sent until a previous data frame had traveled all the way around the ring, back to the sender. Therefore, the FDDI protocol allows a sender to regenerate a new token as soon as it sends its last frame, without waiting for the frame to circulate to every station. But in most other ways, FDDI permits data structures very similar to 802.5, including acknowledgement bits in a frame status byte to indicate that data has been received.

An important advantage of FDDI rings, that is inherent in token ring architecture, is a property known as "fairness." The FDDI protocol is inherently fair because it allows any station to seize the token and therefore control the ring. The amount of time any station may hold the token is limited, and a new token may only be regenerated by the current token holder if certain fairness rules are satisfied. However, the fairness aspect is a trade off with performance. The principal hit to performance is caused by the need to wait for a "free" token before sending data. Accordingly, the inventors have recognized that it would be an improvement to the art if performance could be improved without sacrificing fairness on the ring.

SUMMARY OF THE INVENTION

An objective of the present invention is to improve the performance of a token ring network without requiring a change to its topology.

A further objective of the present invention is to maintain the degree of fairness of a token ring network, while also improving its overall data rate performance.

These objectives are met by implementing a protocol that uses a data structure that allows a receiver station to become a secondary sender without interrupting the flow of data from the primary sender. The secondary sender may send data during the period while the token is seized by the primary sender and also while the secondary sender is accomplishing its tasks as a primary receiver. The performance is increased by allowing the secondary sender to efficiently use the data field without any delay in sending an acknowledgement to the primary sender. The primary sender must obey token-holding rules so there is no degradation of fairness.

The objects and advantages of the present invention will best be understood with reference to the Drawing and the Detailed Description below.

DETAILED DESCRIPTION OF THE PREFERRED EMBODIMENTS

Figure 1:
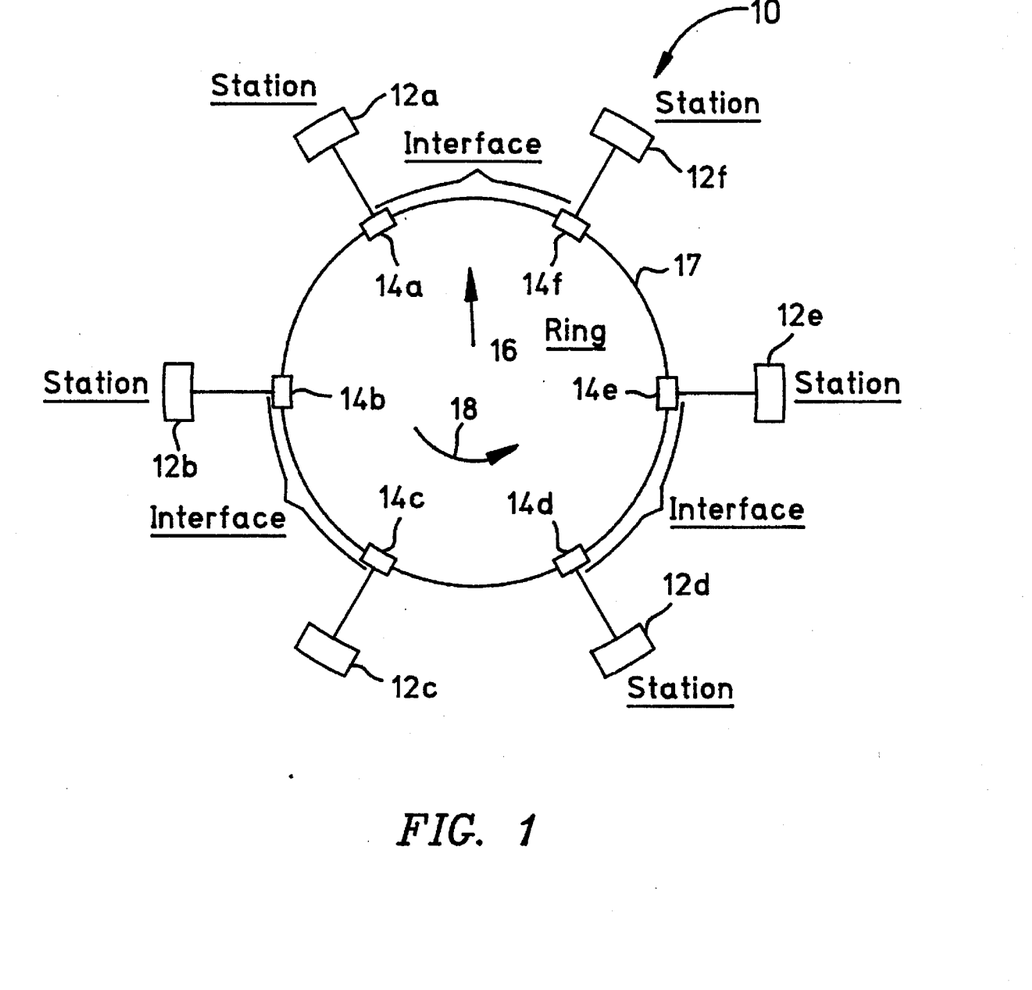
FIG. 1 is a schematic representation of the topology of a token ring network useful for implementing the present invention.

Referring to FIG. 1, a topology of a token ring network 10 which is preferably employed to implement the present invention is shown. In the token ring employing a conventional FDDI protocol, each station 12a–f has a respective interface 14a–f that allows for transmitting and receiving data that is passed around ring 16 in one nominal direction, such as direction 18. The ring 16 comprises medium 17 and each station's interface. Preferably, medium 17 is optical fiber. Information is transferred sequentially from one active station to the next active station.

Referring again to FIG. 1, sender station 12a is holding a token, allowing it to have access to medium 17 and send data to designated receiver station 12d. Thus, in a conventional token ring, only station 12a is allowed to transmit information on the ring. The flow of data is in direction 18 and all stations in the data flow path are referred to as being "downstream". The information is transferred sequentially from 12a to downstream neighbor 12b and then is passed to the next downstream neighbor, and so forth to each succeeding downstream neighbor. Stations 12b and 12c essentially repeat each bit received with the above described 1-bit delay. The receiver station 12d copies the information as it passes on its way back to station 12a. Upon sending its final data frame, station 12a removes the information from the ring and regenerates a token, which it releases. By redefining architectured data fields, as described in detail below, the inventors have provided a way to increase the performance of a token ring network, such as network 10, without requiring a change to either the physical or logical topology of the ring.

It is useful to explain the data structures implemented by a conventional FDDI token ring to better teach the present invention. However, it should be noted that the methods of employing a new protocol with the disclosed new data structure for increasing performance is easily adaptable to a token ring based on IEEE 802.5 standards.

Basic FDDI Protocol

Figure 2:
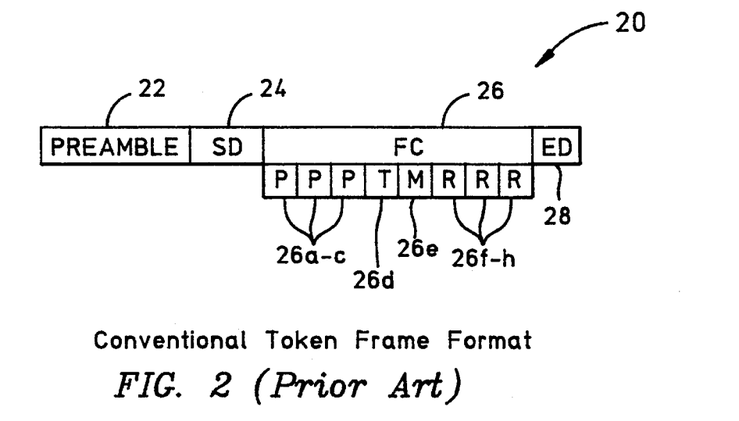
FIG. 2 is a diagram of a token frame data structure implemented in a conventional FDDI network.

FIG. 2 shows a conventional token frame 20 format for implementing an FDDI protocol. Field 22 is the Preamble field which is used for synchronizing the frame 20 with the local clock of any station 12 on ring 16. Field 24 is the Starting Delimiter (SD) that is used to mark a frame boundary for the Frame Control (FC) field 26. An Ending Delimiter (ED) field 28 marks the end of the FC field. The FC field is used to distinguish data frames from token frames. The FC field contains three priority bits 26a–c, a token bit 26d that indicates the frame type (token or dam), a monitor bit 26e, and three reservation bits 26f–h.

Figure 3:
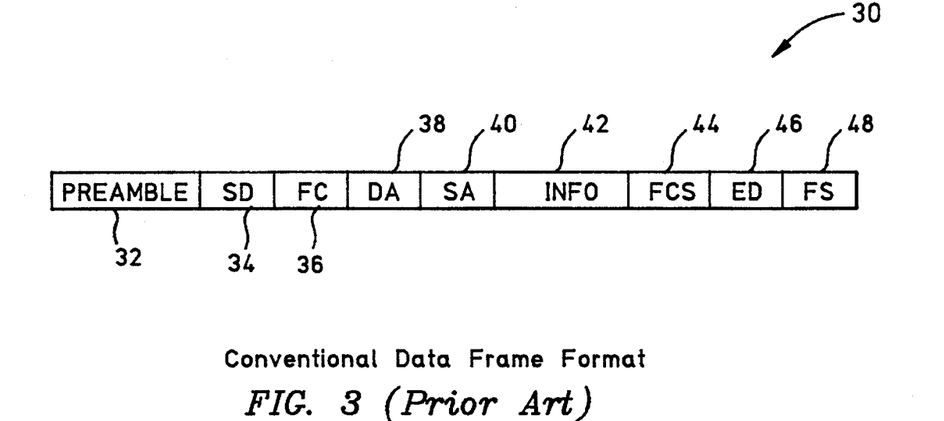
FIG. 3 is a diagram of a data frame data structure implemented in a conventional FDDI network.

FIG. 3 shows a conventional data frame 30 format for implementing an FDDI protocol. The Preamble field 32 is used to synchronize the data frame 30 with the local station's clock. The SD field 34 marks the frame 30's starting boundary, while the ED field 46 marks the ending boundary. The FC field 36 is used to distinguish this frame as a data frame. The Destination Address (DA) field 38 indicates a receiving station for which data is to be sent. The Sender Address (SA) field 40 is used for the sender station to indicate its return address for receiving an acknowledgment from a receiver station. The INFO field 42 is used for placing the data to be sent to the receiver, which is indicating by address DA. The Frame Check Sequence (FCS) field 44 is used for error checking. The Frame Status (FS) field 48 is a byte containing bits to be modified by a receiving station to indicate an acknowledgement of received data. The byte contains a bit referred to as an A bit and another referred to as a C bit. When a frame arrives at a receiving station, the A bit is turned on. Only if the frame is copied is the C bit turned on. Thus, the inverting of the A and C bits can be used by a sending or transmitting station to examine for acknowledgment when a frame returns from its journey around the ring. Typically the A and C bits are duplicated within the same FS field to ensure reliability.

This conventional FDDI protocol only allows for the transmission of one data frame by the token owner at any given time. Hence the data structure used by the transmitting and listening mode only includes one sender address and one receiver address. The present invention circumvents this problem by implementing a new data structure in a new protocol that allows a secondary mode of transmission that improves the performance of a token ring network without requiring any changes to physical or logical topology.

Improved Protocol

Figure 4:
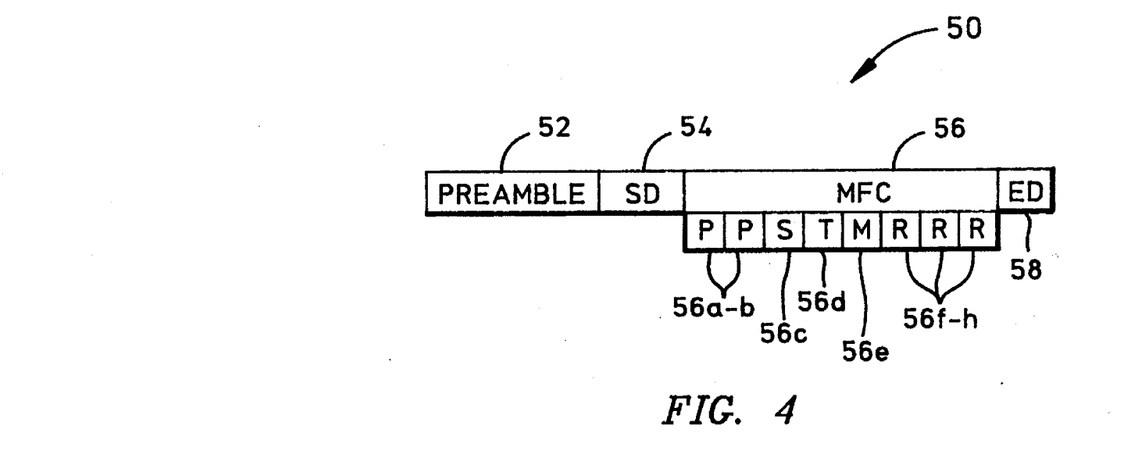
FIG. 4 is a diagram of a token frame data structure implemented in the present invention.

Referring to FIGS. 4, a new data structure for a new token frame 50 format is shown. A preamble field 52 and a SD field 54 serves the same function as identical fields in frame 20. A Multiple Frames Control (MFC) field 56 is used to serve for frame control of primary or secondary transmissions of data. ED field 58 serves as an ending delimiter for MFC field 56. The MFC field 56 is constructed identical to a conventional FC field 26 (FIG. 2), with the exception of substituting a secondary (S) transmission field 56c to replace what is normally a priority bit. The bit is used to indicate a secondary transmission in one state and no secondary in the other state. Priority bits 56a–b, token bit 56d, monitor bit 56e, and reservation bits 56f–h serve identical functions as identical bits in frame 20 (FIG. 2).

New fields implemented by the new protocol of the present invention allow a secondary data transfer to occur by a station that is not the holder of the token. To differentiate between data transmitting stations, it is best to refer to the token holding stations as the "primary sender", rather than the prior art designation of simply "sender". The receiver designated by the primary sender is the "primary receiver." After copying transmitted data, the primary receiver may enter transmit mode and become a "secondary sender." The secondary sender designates a "secondary receiver" to receive transmitted data.

Figure 5:
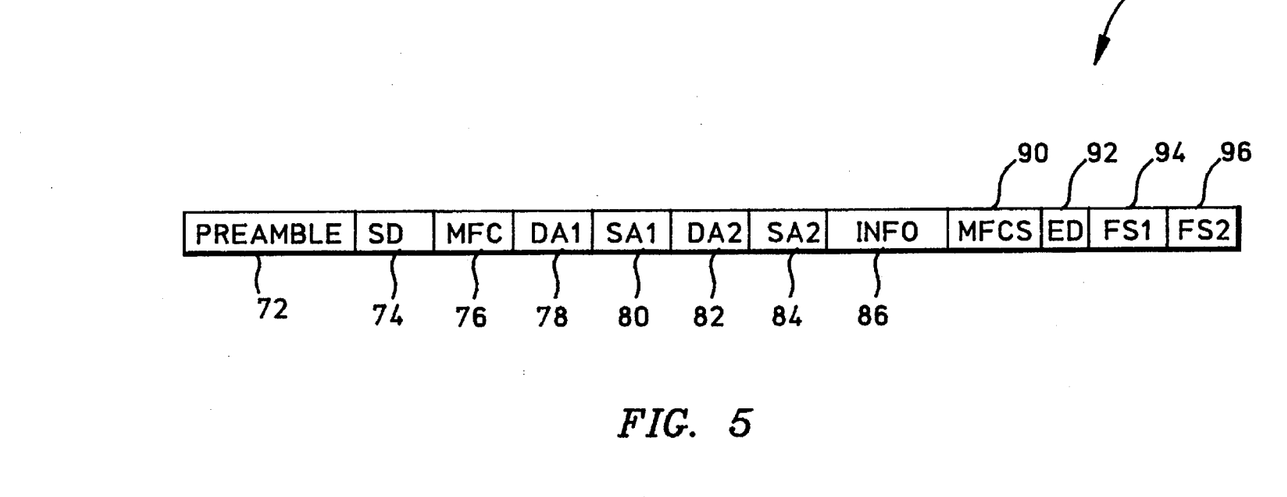
FIG. 5 is a diagram of a data frame data structure implemented in the present invention.

Referring to FIG. 5, a new data structure for a new data frame 70 format is shown. Preamble and SD fields, 72 and 74 respectively, serve an identical function as in the conventional FDDI protocol discussed above. The MFC field 76 is identical to the MFC field 56 and contains identical bit fields. The DA1 field 78 and the SA1 field 80 contain the respective addresses of a primary receiver and a primary sender. New address fields 82 and 84 contain an additional destination address DA2 for a secondary receiver and a sender address SA2 for a secondary sender, respectively. The addition of the new field 96 contains a frame status field FS2, that contains the A and C status bits that are used by the secondary receiver to acknowledge receipt of data from the secondary sender. The FS1 field 94 is used in a similar fashion for acknowledgements to the primary sender of data received by the primary receiver.

Data to be sent from the primary sender to the primary receiver is placed in INFO field 86. Data that is to be sent from the secondary sender to the secondary receiver eventually replaces this data INFO field 86. A Multiple Frames Check Sequence Field 90 is used for error checking for both primary and secondary transmissions. An End Delimiter 92 marks the end of the Data France 70.

FIGS. 6–9 illustrate a useful method for implementing a new protocol that uses the new data structures of FIGS. 4 and 5. In order to illustrate the applicability of the present invention to the known token ring topology, the method is explained as being implemented with the stations in the ring of FIG. 1. The steps shown in one of the flow diagrams may not end the process, but rather the process is continued on the next flow diagram. Such a continuation is shown with matching letters (A–D) to represent a connection step for two separate charts. This will best be understood with reference to each of the diagrams in FIGS. 6–9.

Figure 6:
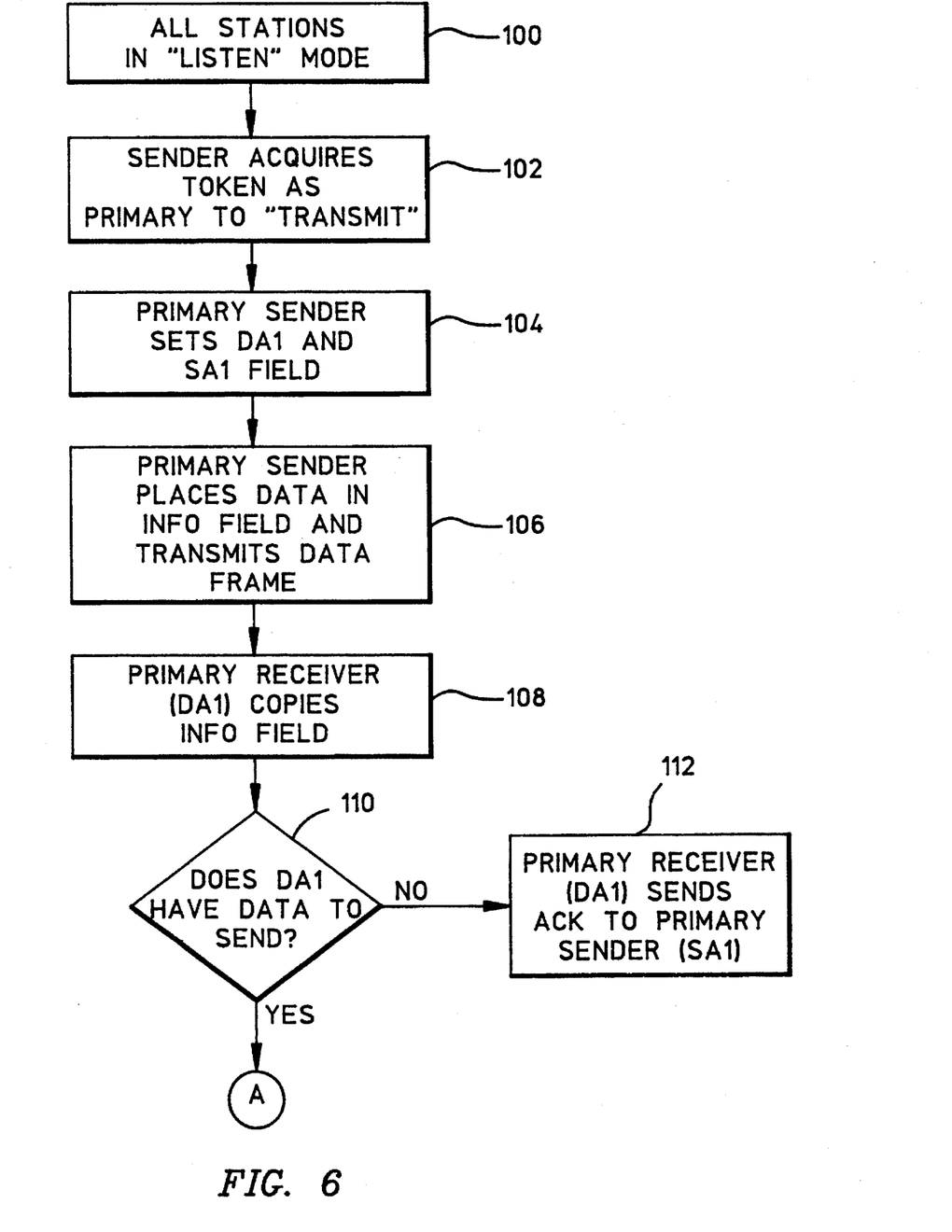
FIGS. 6, 7, 8 and 9 are flow diagrams of a method of implementing the protocol of the present invention.

Referring to FIG. 6, Step 100 starts the implementation of the present invention, wherein all stations on ring 16 are placed in listen mode as the token is freely passed from station to station. In step 102, station 12a seizes the token and becomes the primary sender on the ring. Station 12a will now hold the token and transmit data on the ring. In step 104, the primary sender sets the proper address fields in the data frame 70. The primary sender sets both the DA1 field to designate the destination address of a primary receiver and the SA1 field to indicate its own return address for acknowledgement from the primary receiver. Given the topology depicted in FIG. 1, a good choice for the primary receiver is station 12d. In step 106, the primary sender places data into the INFO field of the data frame and transmits the frame. The preceding steps carried out by the primary sender may be implemented according to the conventional FDDI protocol.

Figure 10:
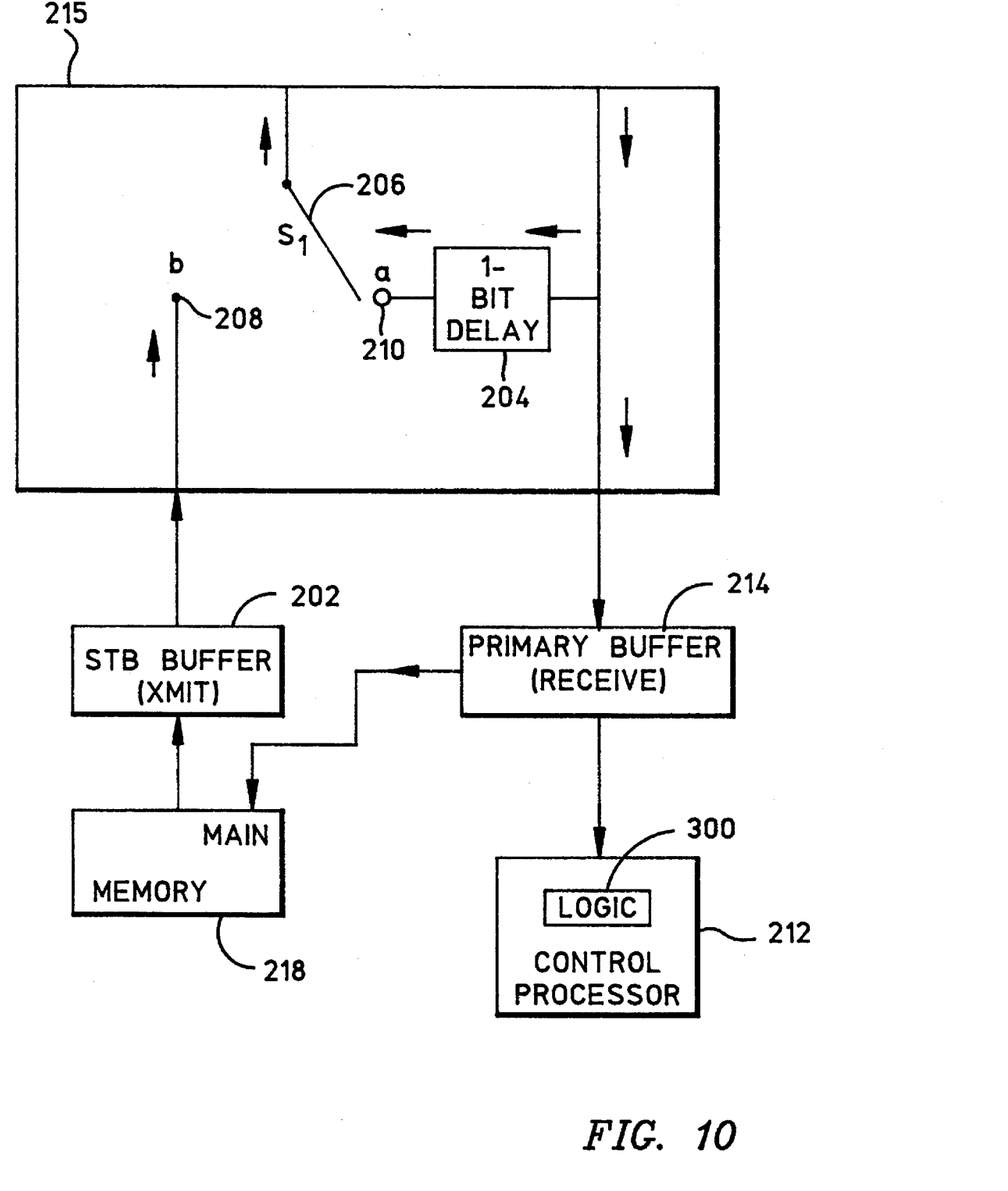
FIG. 10 is a schematic representation of station interface logic that is useful for implementing the present invention.

Referring to FIGS. 6 and 10, when the data frame 70 arrives at station 12d, the primary receiver in accordance with Step 108 copies the entire frame into a primary buffer 214. The data field is copied from the INFO field 86 of frame 70. In step 110, an inquiry is performed to determine if the primary receiver has data of its own to transmit. If the answer is "no", then the normal FDDI token ring protocol is obeyed. Thus, in step 112, the primary receiver prepares an acknowledgement message to send back to station 12a (located by address field, SA1) by modifying bits of the frame status field, FS1.

Figure 7:
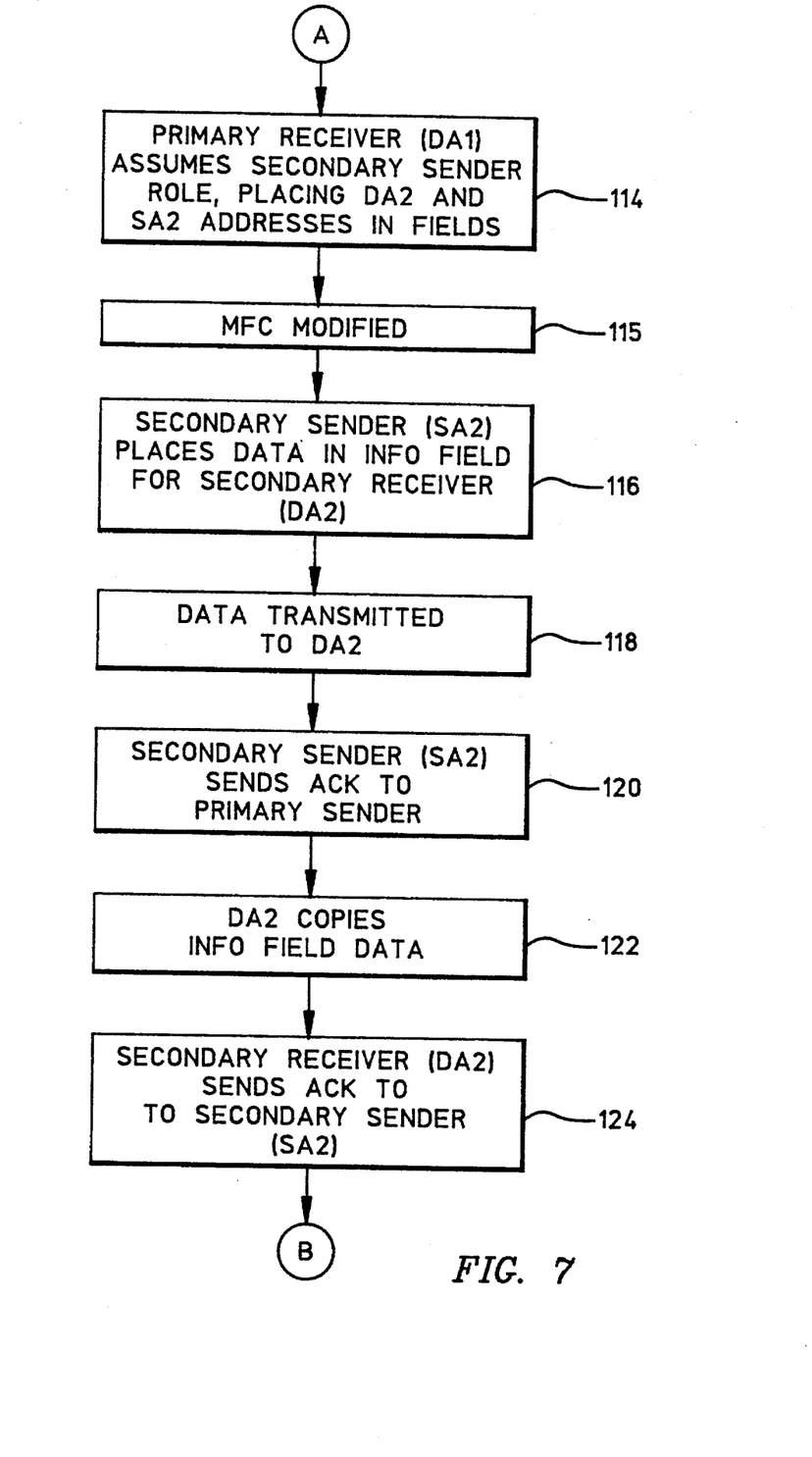

With references to FIGS. 6 and 7, if the answer to the inquiry is "yes", then the new data structures are implemented to allow a secondary transmission to occur on the ring simultaneous with a primary transmission. This is shown in step 114 wherein the primary receiver (station 12d) assumes a new role as secondary sender by placing an address DA2 in destination address field 82 to indicate a secondary receiver to receive secondary transmissions. A good choice for the station having address DA2 is station 12e. Additionally, in step 114, the secondary sender (station 12d) places its own return address SA2 in field 84 for receiving an acknowledgement from the secondary receiver, station 12e. In step 115, MFC field 76 is updated to indicate that there is a secondary transmission state being entered into.

With reference to FIG. 7, the secondary sender replaces the data in the INFO field 86 in Step 116. This new data overwrites the data placed there by the primary sender. This new data is transmitted to the secondary receiver that is defined by the address DA2, in step 118. Thus, the invention takes advantage of the fact that the data frame will need to circulate back to the primary sender to better utilize the time involved by sending its own data in the frame 70. In step 120, the station 12d as secondary sender performs an identical acknowledgement step as it would have performed in the primary receiver role (see step 112, above) by modifying bits in the FS1 field. Upon receiving the data, the secondary receiver copies the data from the INFO field, as shown in step 122. Then in step 124 the secondary receiver sends an acknowledgement to the secondary sender (address SA2) by modifying bits in the second frame status field FS2. The data frame is then passed around the ring to the next downstream neighbor, eventually returning to the primary sender, station 12a identified by the address field SA1.

Figure 8:
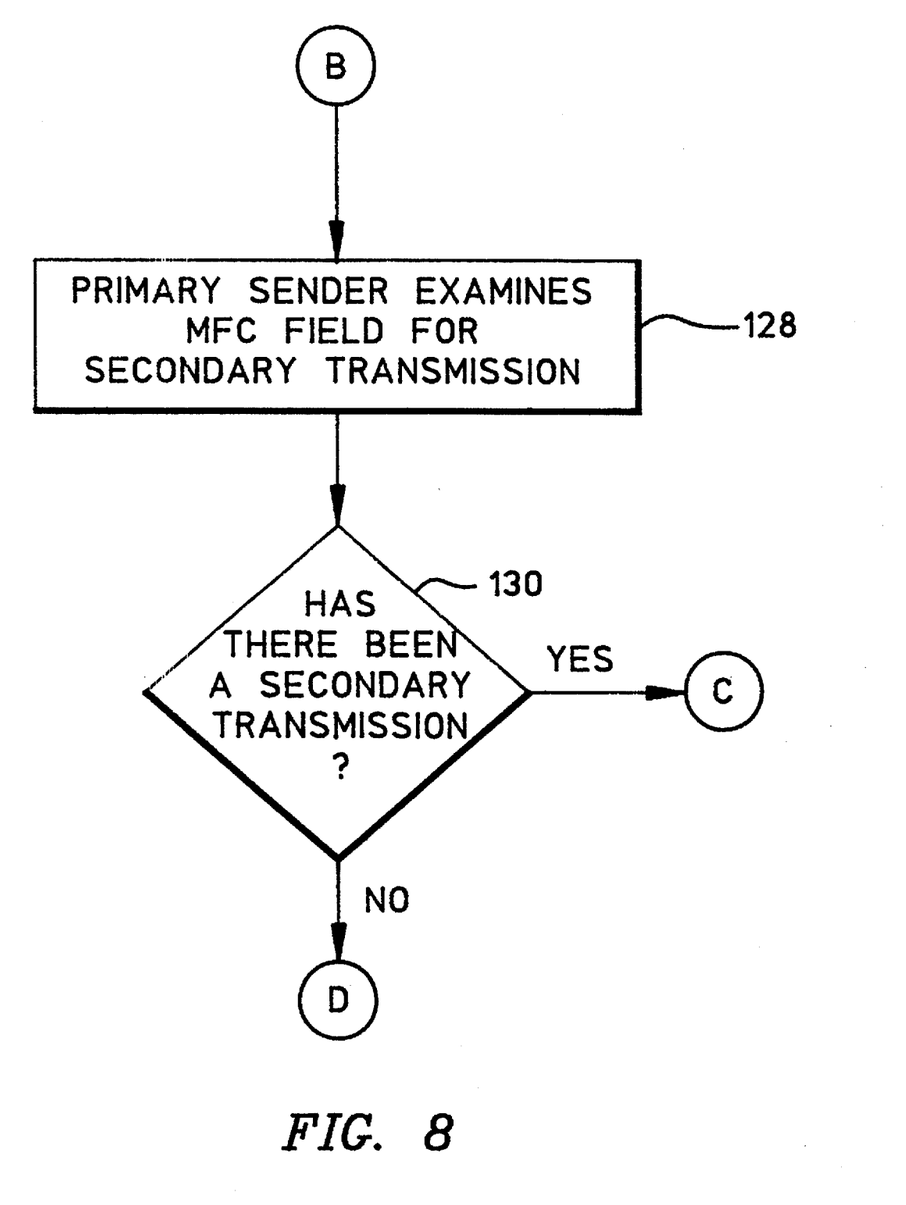
Figure 9:
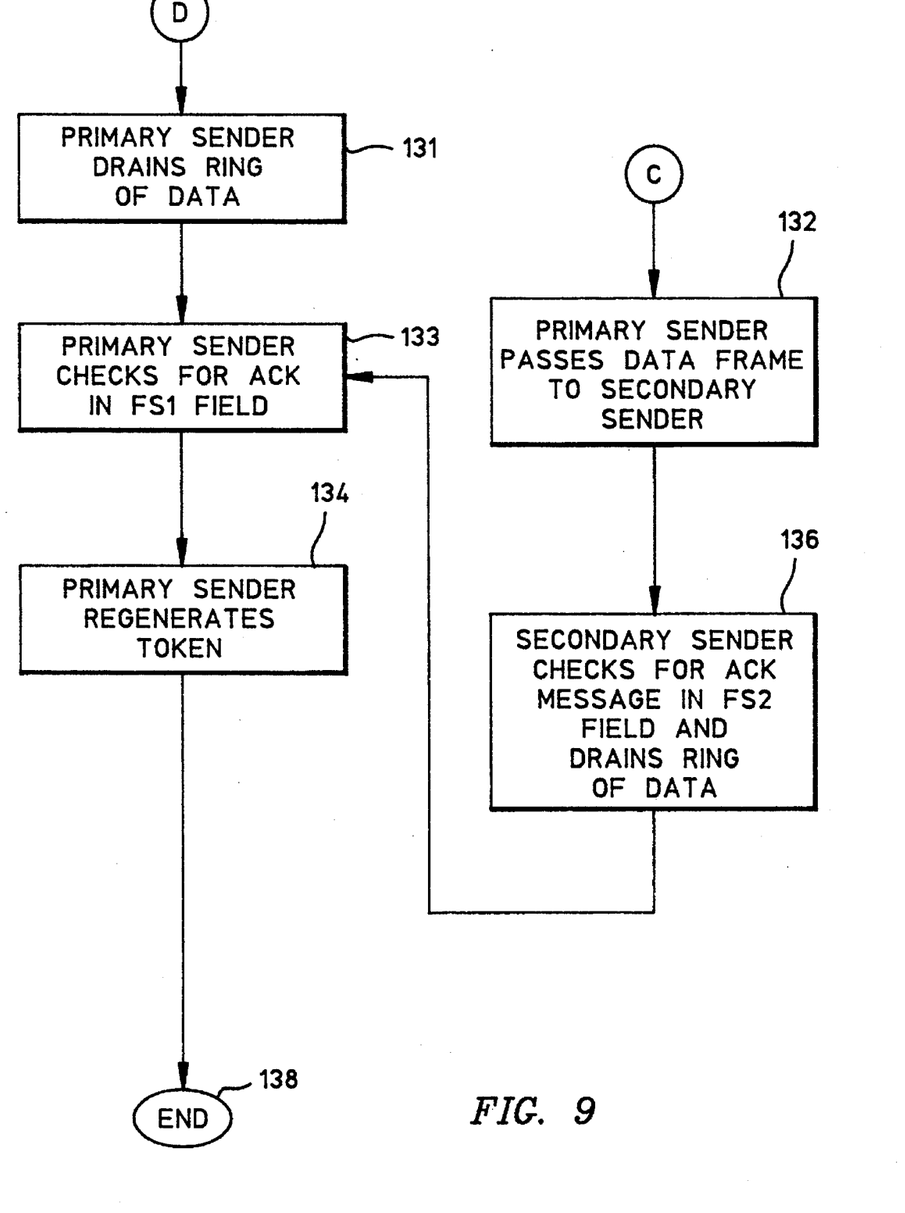

Referring to FIGS. 8 and 9, the primary sender examines the MFC fields to determine of there has been a secondary transmission of data, as shown in step 128. Step 130 is an inquiry that is based on the determination of step 128. If there has been secondary transmission then the primary sender passes the data frame downstream in step 132. Eventually the frame reaches the secondary sender so that it may check for acknowledgement from the secondary receiver, as shown in step 136. If there has not been a secondary transmission, then the primary sender drains the ring of data in step 131. Steps 133 and 134 are performed whether or not there is a secondary transmission. Additionally, in step 136, the secondary sender drains the data frame 70 from the ring. Normal token ring error recovery techniques, well-known in the art, may be employed if the ACK is not received. The method steps related to one cycle of a token's circulation end in step 138.

Station Interface

A preferred embodiment of an interface unit for implementing the present invention is shown in logic schematic 200. It is envisioned that the invention will be implemented as part of a station's electronic hardware; however, the inventors recognize that the invention can be totally implemented in software without departing from the spirit of the invention. Preferably the invention is implemented as an adaptation to existing token ring interface cards, such as the IBM token ring interface card. The preference exists because of the ease of implementing the invention by improving pre-existing card interface technology. However, the invention can be implemented on any well known computer usable medium, such as tape or disk, that contains equivalent logic to that shown in schematic 200 and implements the method steps described above.

In a preferred embodiment, control logic 300 in control processor 212 controls the implementation of the method steps involved with carrying out the protocol of the present invention. A ring interface logic unit 215 is coupled with the control processor 212 and has various components which will be discussed below. The information to be placed in data fields, DA2, SA2, INFO, MFCS, ED, and FS 1 fields can be stored in a so-called secondary transmission buffer 202 to be written in the station data frame 70, when the station becomes a secondary sender. The transmission buffer 202 is considered part of logic unit 215, although it may be physically located anywhere as long as it is coupled electronically to the rest of unit 215. The transmission buffer ensures a quick transition from listen to transmit mode, so that the secondary sender can perform its transmission after the SA 1 field has been copied onto the ring. A main memory 218 in communication with a primary receive buffer 214 enables storage and transfer of data between the transmission buffer, control logic, and the rest of the ring interface.

As a station leaves the listen mode and turns to secondary transmitting mode, Switch 206 is commanded by logic 300 in processor 212 to switch from position 210 to position 208. Preferably, this should occur after the SA1 field has been transmitted on the ring by the secondary sender to minimize the impact to normal token ring performance. The station returns to listening mode and relinquishes its role as a secondary sender, as switch 206 returns to position 210 following a successful receipt of an acknowledgement from a secondary receiver. Accordingly, the bit delay 204 is returned to operation as the station is placed in listening mode.

A preferred embodiment of the present invention has been described for improving the performance of a token ring network without changing the topology of the ring. Modifications and adaption thereof may occur to persons skilled in the art, in light of the teachings herein. Therefore, protection afforded the present invention should only be limited in accordance with the scope of the following claims.

What is claimed is:

1. A method for improving the performance of a token ring network including a plurality of stations connected in a ring by a network for passing a token according to a token ring protocol, wherein each station has an address on the ring and only one station, according to the token ring protocol, may seize the token to transmit a data frame around the ring containing address information and data in a data field, the station seizing the token to transmit the data frame being denoted as the Primary Sender Station (PSS), and the data frame being addressed to a primary receiver station (PRS), the method comprising the steps of:

responsive to receiving a primary data frame from the PSS, the PRS copying the data and placing a PSS acknowledgment in the primary data frame addressed to the PSS;

the PRS assuming a role as a secondary sender station (SSS) if the PRS has data to send to a secondary receiver station (SRS) on the ring and creating a secondary data frame by replacing the data with new data addressed for the SRS while retaining the PSS acknowledgement, and the PRS sending the secondary data frame around the ring;

responsive to receiving a data frame with the PSS acknowledgement that has been transmitted around the ring with the token, the PSS determining if the data frame with the PSS acknowledgement is a primary data frame or a secondary data frame by determining if there is new data addressed for the SRS; and responsive to determining whether there is new data addressed for the SRS station, the PSS transferring the data frame with the PSS acknowledgement relative to the ring according to whether the data frame received is a returned primary data frame or a returned secondary data frame.

2. The method of claim 1 and further comprising the step of the SRS being responsive to receiving a secondary data frame that has been transmitted around the ring by copying the data in the data field and placing an SSS acknowledgement in the secondary data frame addressed to the SSS and re-transmitting the secondary data frame around the ring with the token.

3. The method of claim 1, wherein if the data frame received at the PSS is the secondary data frame then the transferring step is accomplished by the PSS by re-transmitting the secondary data frame addressed to the SRS around the ring with the token.

4. The method of claim 3 and further comprising the step of:

the SSS being responsive to receiving the secondary data frame containing the SSS acknowledgement by draining the ring of the secondary data frame.

5. The method of claim 1, wherein if tile data frame received at the PSS is the returned primary data frame then the transferring step is accomplished by the PSS by draining the ring of the primary data frame.

6. The method of claim 5, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

7. The method of claim 6, wherein the step of determining if there is new data addressed for the SRS is determined by examining a multiple frames control (MFC) field, locating the address of the SRS in the secondary destination field in the secondary data frame and locating the address of the SSS in the secondary data frame.

8. The method of claim 1, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

9. The method of claim 8, wherein the step of determining if there is new data addressed for the SRS is determined by examining a multiple frames control (MFC) field, locating the address of the SRS in the secondary destination field in the secondary data frame and locating the address of the SSS in the secondary data frame.

10. The method of claim 1, wherein the secondary data frame includes a secondary frame status field and the SSS acknowledgement is placed in the secondary data frame by modifying status indicators in the secondary frame status field.

11. The method of claim 10, wherein the secondary frame status field contains a byte of status information and the step of modifying status indicators in the secondary frame status field consists of modifying at least one bit of the byte of status information.

12. The method of claim 1, wherein the primary data frame includes a data info field and the data addressed for the PRS is written in the data info field in the primary data frame.

13. The method of claim 12, wherein the data addressed for the SRS is written in the data info field thereby replacing the data addressed for the PRS.

14. The method of claim 1, wherein the data frame with the PSS acknowledgement that has been transmitted around the ring with the token includes a multiple frames control (MFC) field that is used to indicate whether or not this data frame is a secondary data frame.

15. The method of claim 1, wherein the primary data frame includes a multiple frames check sequence field that is used for error checking.

16. The method of claim 1, wherein the primary data frame includes a primary destination address field and data addressed for the PRS is addressed by the PSS writing the address of the PRS in the primary destination address field.

17. The method of claim 16, wherein the primary data frame includes a primary sender address field and a PSS acknowledgement field in the data frame addressed to the PSS is addressed by the PSS writing the address of the PSS in the primary sender address field.

18. The method of claim 17, wherein the primary data frame includes a primary frame status field and the PSS acknowledgement is placed in the data frame by modifying status indicators in the primary frame status field.

19. A system for implementing an improvement of performance in a token ring network including a plurality of stations connected in a ring by a network for passing a token according to a token ring protocol, wherein each station has an address on the ring and only one station, in accordance with the token ring protocol, may seize the token to transmit a data frame around the ring containing address information and data in a data lid& the station seizing the token to transmit the data frame being denoted as the Primary Sender Station (PSS), and the data frame being addressed to a primary receiver station (PRS), the system comprising:

an interface unit coupled to each addressable station in the network capable of transmitting data on the ring including a control processor with control logic for implementing the protocol on the ring, a primary receive buffer coupled with the control processor, and ring interface logic having a secondary transmission buffer coupled to the primary buffer, and the ring interface logic also being coupled to the control processor for interfacing the coupled addressable station with the ring;

the control logic adapted to implement the token ring protocol to control the interaction of the following control logic activated steps:

responsive to receiving a primary data frame from the PSS, the PRS copying the data and placing a PSS acknowledgment in the primary data frame addressed to the PSS;

the PRS assuming a role as a secondary sender station (SSS) if the PRS has data to send to a secondary receiver station (SRS) on the ring and creating a secondary data frame by replacing the data with new data addressed for the SRS while retaining the PSS acknowledgement, and the PRS sending the secondary data frame around the ring;

responsive to receiving a data frame with the PSS acknowledgement that has been transmitted around the ring with the token, the PSS determining if the data frame with the PSS acknowledgement is a primary data frame or a secondary data frame by determining it there is new data addressed for the SRS; and responsive to determining whether there is new data addressed for the SRS station, the PSS transferring the data frame with the PSS acknowledgement relative to the ring according to whether the data frame received is a returned primary data frame or a returned secondary data frame.

20. The system of claim 19, wherein the control logic is further adapted to implement the following step of the SRS being responsive to receiving a secondary data frame that has been transmitted around the ring by copying the data in the data field and placing an SSS acknowledgement in the secondary data frame addressed to the SSS and re-transmitting the secondary data frame around the ring with the token.

21. The system of claim 19, wherein if the data frame received at the PSS is the secondary data frame then the transferring step is accomplished by the PSS by re-transmitting the secondary data frame addressed to the SRS around the ring with the token.

22. The system of claim 21, wherein the control logic is further adapted for implementing the step of:

the SSS being responsive to receiving the secondary data frame containing the SSS acknowledgement by draining the ring of the secondary data frame.

23. The system of claim 19, wherein if the data frame received at the PSS is the returned primary data frame then the transferring step is accomplished by the PSS by draining the ring of the primary data frame.

24. The system of claim 23, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

25. The system of claim 24, wherein the step of determining if there is new data addressed for the SRS is determined by examining a multiple frames control (MFC) field, locating the address of the SRS in the secondary destination field in the secondary data frame and locating the address of the SSS in the secondary data frame.

26. The system of claim 19, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

27. The system of claim 26, wherein the step of determining if there is new data addressed for the SRS is determined by examining a multiple frames control (MFC) field, locating the address of the SRS in the secondary destination field in the secondary data frame and locating the address of the SSS in the secondary data frame.

28. The system of claim 19, wherein the secondary data frame includes a secondary frame status field and the SSS acknowledgement is placed in the secondary data frame by modifying status indicators in the secondary frame status field.

29. The system of claim 28, wherein the secondary frame status field contains a byte of status information and the step of modifying status indicators in the secondary frame status field consists of modifying at least one bit off the byte of status information.

30. The system of claim 19, wherein the primary data frame includes a data info field and the data addressed for the PRS is written in the data info field in the primary data frame.

31. The system of claim 30, wherein the data addressed for the SRS is written in the data info field thereby replacing the data addressed for the PRS.

32. The system of claim 19, wherein the data frame with the PSS acknowledgement that has been transmitted around the ring with the token includes a multiple frames control (MFC) field that is used to indicate whether or not this data frame is a secondary data frame.

33. The system of claim 19, wherein the primary data frame includes a multiple frames check sequence field that is used for error checking.

34. The system of claim 19, wherein the primary data frame includes a primary destination address field and data addressed for the PRS is addressed by the PSS writing the address of the PRS in the primary destination address field.

35. The system of claim 34, wherein the primary data frame includes a primary sender address field and a PSS acknowledgement field in the data frame addressed to the PSS is addressed by the PSS writing the address of the PSS in the primary sender address field.

36. The system of claim 35, wherein the primary data frame includes a primary frame status field and the PSS acknowledgement is placed in the data frame by modifying status indicators in the primary frame status field.

37. An interface unit for improving the performance of a token ring network including a plurality of stations connected in a ring by a network for passing a token according to a token ring protocol, wherein each station has an address on the ring and wherein according to the token ring protocol, only one station may seize the token to transmit a data frame around the ring containing address information and data in a data field, the station seizing the token to transmit the data frame being denoted as the Primary Sender Station (PSS), and the data frame being addressed to a primary receiver station (PRS), the interface comprising:

a control processor with control logic for implementing data transmissions according to the token ring protocol on the ring;

a primary receive buffer coupled with the control processor;

ring interface logic having a secondary transmission buffer coupled to the primary buffer, and the ring interface logic also being coupled to the control processor for interfacing the coupled addressable station with the ring; and the ring interface logic further having a switch that has a first switchable position for placing the PRS in a first state capable of receiving and copying a data frame passed from the PSS into the primary buffer and a second switchable position for placing the PRS in a second state denominated as a secondary transmission state, the second state being switched to if the PRS has data to send to another station on the token ring network, wherein the secondary transmission state is adapted to copy new data from the secondary transmission buffer into the data frame to replace the data addressed to the PRS and transmit the new data in a modified data frame on the ring with the token.

38. A computer program product comprising:

a computer usable medium having computer readable program code embodied therein for causing an improvement in performance of a token ring network including a plurality of stations connected in a ring by a network for passing a token according to a token ring protocol, wherein each station has an address on the ring and only one station, according to the token ring protocol, may seize the token to transmit a data frame around the ring containing address information and data in a data field, the station seizing the token to transmit the data frame being denoted as the Primary Sender Station (PSS), and the data frame being addressed to a primary receiver station (PRS), the computer program code in communication with each station in the network and adapted to activate and execute the following steps:

responsive to receiving a primary data frame from the PSS, the PRS copying the data and placing a PSS acknowledgment in the primary data frame addressed to the PSS;

the PRS assuming a role as a secondary sender station (SSS) if the PRS has data to send to a secondary receiver station (SRS) on the ring and creating a secondary data frame by replacing the data with new data addressed for the SRS while retaining the PSS acknowledgement, and the PRS sending the secondary data frame around the ring;

responsive to receiving a data frame with the PSS acknowledgement that has been transmitted around the ring with the token, the PSS determining if the data frame with the PSS acknowledgement is a primary data frame or a secondary data frame by determining if there is new data addressed for the SRS; and responsive to determining whether there is new data addressed for the SRS station, the PSS transferring the data frame with the PSS acknowledgement relative to the ring according to whether the data frame received is a returned primary data frame or a returned secondary data frame.

39. The computer program product of claim 38, further enabled to execute the step of the SRS being responsive to receiving a secondary data frame that has been transmitted around the ring by copying the data in the data field and placing an SSS acknowledgement in the secondary data frame addressed to the SSS and re-transmitting the secondary data frame around the ring with the token.

40. The computer program product of claim 38, wherein if the data frame received at the PSS is the secondary data frame then the transferring step is accomplished by the PSS by re-transmitting the secondary data frame addressed to the SRS around the ring with the token.

41. The computer program product of claim 40, further enabled to execute the steps of:

the SSS being responsive to receiving the secondary data frame containing the SSS acknowledgement by draining the ring of the secondary data frame.

42. The computer program product of claim 38, wherein if the data frame received at the PSS is the returned primary data frame then the transferring step is accomplished by the PSS by draining the ring of the primary data frame.

43. The computer program product of claim 42, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

44. The computer program product of claim 43, wherein the step of determining if there is new data addressed for the SRS is determined by examining a multiple frames control (MFC) field, locating the address of the SRS in the secondary destination field in the secondary data frame and locating the address of the SSS in the secondary data frame.

45. The computer program product of claim 38, wherein the secondary data frame includes a secondary destination address field and a secondary sender address field and the step of the PRS assuming a role of the SSS includes the additional steps of writing the address of the SRS in the secondary destination field and writing the address of the SSS in the secondary sender address field.

46. The computer program product of claim 45, wherein the step of determining if there is new data addressed for the SRS is determined by examining a multiple frames control (MFC) field, locating the address of the SRS in the secondary destination field in the secondary data frame and locating the address of the SSS in tile secondary data frame.

47. The computer program product of claim 38, wherein the secondary data frame includes a secondary frame status field and the SSS acknowledgement is placed in the secondary data frame by modifying status indicators in the secondary frame status field.

48. The computer program product of claim 47, wherein the secondary frame status field contains a byte of status information and the step of modifying status indicators in the secondary frame status field consists of modifying at least one bit of the byte of status information.

49. The computer program product of claim 38, wherein the primary data frame includes a data info field and the data addressed for the PRS is written in the data info field in the primary data frame.

50. The computer program product of claim 49, wherein the data addressed for the SRS is written in the data info field thereby replacing the data addressed for the PRS.

51. The computer program product of claim 38, wherein the data frame with the PSS acknowledgement that has been transmitted around the ring with the token includes a multiple frames control (MFC) field that is used to indicate whether or not this data frame is a secondary data frame.

52. The computer program product of claim 38, wherein the primary data frame includes a multiple frames check sequence field that is used for error checking.

53. The computer program product of claim 38, wherein the primary data frame includes a primary destination address field and data addressed for the PRS is addressed by the PSS writing the address of the PRS in the primary destination address field.

54. The computer program product of claim 53, wherein the primary data frame includes a primary sender address field and a PSS acknowledgement field in the data frame addressed to the PSS is addressed by the PSS writing the address of the PSS in the primary sender address field.

55. The computer program product of claim 54, wherein the primary frame includes a primary frame status field and the PSS acknowledgement is placed in the data frame by modifying status indicators in the primary frame status field.

* * * * *

UNITED STATES PATENT AND TRADEMARK OFFICE
CERTIFICATE OF CORRECTION

PATENT NO. : 5,566,178
DATED : October 15, 1996
INVENTOR(S) : Butter et al

It is certified that error appears in the above-indentified patent and that said Letters Patent is hereby corrected as shown below:

Column 9, line 29, change "lid&" to --field,--.

Signed and Sealed this

Eighteenth Day of March, 1997

Attest:

BRUCE LEHMAN

Attesting Officer      Commissioner of Patents and Trademarks